March 4, 1969  J. R. CANADA  3,430,701
TREATING INHOMOGENEOUS SUBTERRANEAN FORMATIONS Filed Dec. 23, 1966  Sheet 1 of 2

INVENTOR
JAMES R. CANADA
James C. Fails
ATTORNEY

March 4, 1969  J. R. CANADA  3,430,701
TREATING INHOMOGENEOUS SUBTERRANEAN FORMATIONS
Filed Dec. 23, 1966  Sheet 2 of 2

INVENTOR
JAMES R. CANADA
James C. Fails
ATTORNEY

United States Patent Office 3,430,701
Patented Mar. 4, 1969

3,430,701
TREATING INHOMOGENEOUS SUBTERRANEAN FORMATIONS
James R. Canada, Dallas, Tex., assignor to Mobil Oil Corporation, a corporation of New York
Filed Dec. 23, 1966, Ser. No. 604,349
U.S. Cl. 166—269    4 Claims
Int. Cl. E21b 43/16, 33/124, 33/127

ABSTRACT OF THE DISCLOSURE

This application discloses means for treating, through a well, a subterranean formation having permeability inhomogeneities. A treating fluid is flowed from perforations between packers, all built into a downhole tool, and onto a portion of the formation while the tool is being moved vertically within the well.

Background of the invention

The invention relates to a method for treating a subterranean formation by injecting a fluid through a well penetrating the formation. In a particular embodiment, the invention relates to a method and apparatus for treating a subterranean formation with more than one fluid.

Fluids are injected through wells into subterranean formations for various purposes. Illustrative are the following examples of such diverse purposes. Fluids may be injected through an injection well into a subterranean formation to supplement the recovery of oil from the subterranean formation through a production well. Fluids may be injected into a well into the subterranean formation to dissolve aqueous material, hydrocarbonaceous material, and solid material such as scale from the vicinity around the well, and the fluids produced back out the same well. Fluids may be injected into a subterranean formation to admix in the formation, react, and consolidate the sand or unconsolidated material in the subterranean formation.

Further, in many cases if the fluids are injected into a subterranean formation having permeability inhomogeneities such as a more permeable stratum and a less permeable stratum, the fluids flow preferentially into the more permeable stratum such that the predominant treatment occurs in the more permeable stratum. Many times, two or more treating fluids are used. Mixing of the treating fluids before emplacement is ordinarily undesirable because of adverse effects such as dilution or premature chemical reaction.

In order to effectively treat the less permeable stratum, separate packers have been employed. These separate packers will straddle the less permeable stratum, where it can be identified, and the fluids injected into this region. Such separate packers are inflexible and must be reset for each region where it is desired to effect treatment.

Summary of the invention

The invention provides a method for effecting desired treatment of strata of unequal permeabilities in a subterranean formation penetrated by a well comprising isolating within the well a movable segment communicating with a source of treating fluid and permeable to the treating fluid, and flowing a treating fluid through the isolated segment and onto the subterranean formation adjacent thereto while simultaneously moving the isolated segment vertically within the well.

In a particular and preferred embodiment, the invention provides a method of more nearly effecting the desired treatment of a subterranean formation penetrated by a well which comprises the steps of: (a) forming an isolated but movable segment within the well, (b) flowing a first treating fluid through a conduit from the surface of the earth to the isolated segment, through the isolated segment, and onto the subterranean formation adjacent thereto while simultaneously moving the isolated segment vertically within the well, (c) introducing a pig into the conduit, (d) flowing another treating fluid behind the pig, through the conduit, through the isolated segment, and onto the subterranean formation adjacent thereto while simultaneously moving the isolated segment vertically within the well, (e) trapping the pig below the isolated segment, and (f) recovering the pig by pulling the conduit from the well.

Description of a specific embodiment

Figure 1:
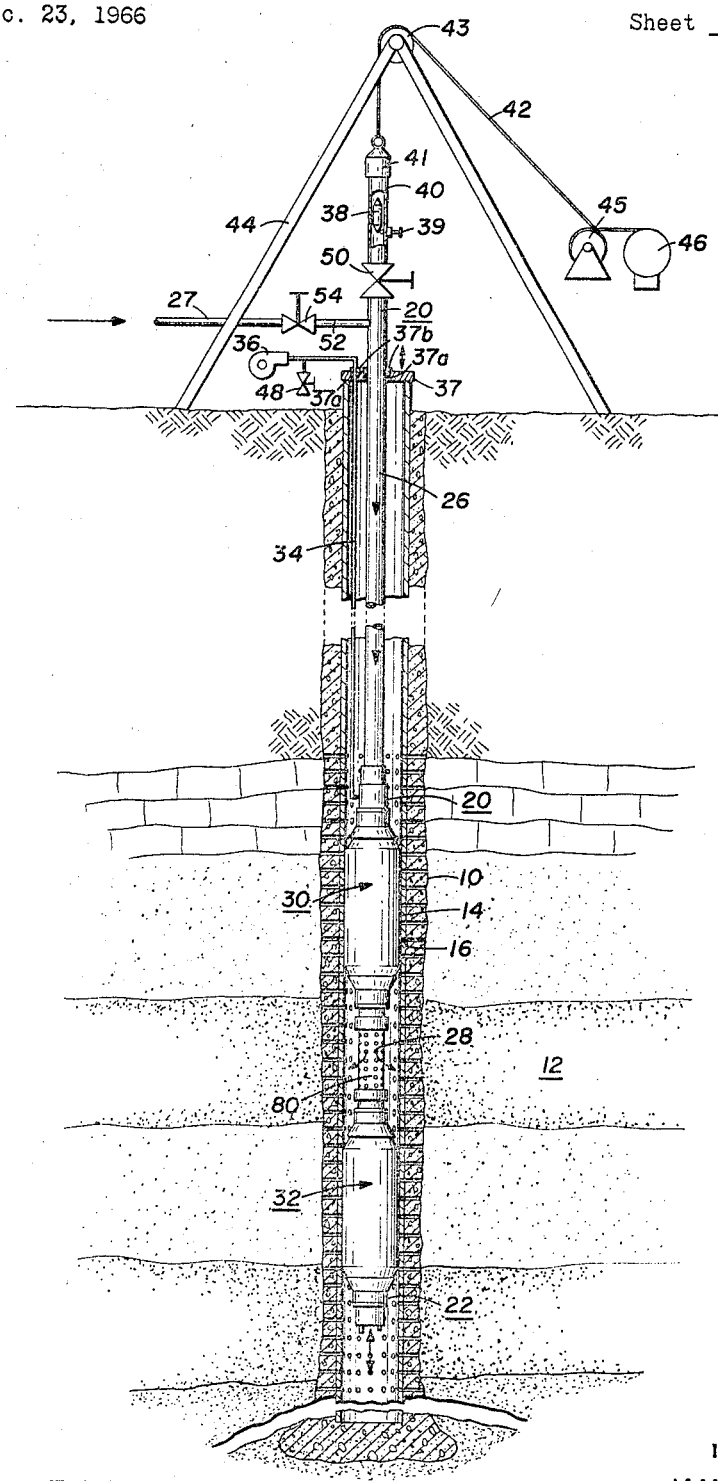
FIGURE 1 illustrates, partly in cross section, application of the invention in treating a subterranean formation having permeability inhomogeneities.

Referring to FIGURE 1, well 10 penetrates subterranean formation 12 having strata of differing permeabilities. Preferably, well 10 has casing 14 cemented therein and has openings 16 onto the subterranean formation 12. Apparatus 20, whose elements will be mentioned in greater detail hereinafter comprises the entire assembly including downhole tool 22 and conduit 26. Apparatus 20 is lowered in casing 14 until downhole tool 22 is positioned at the bottom of formation 12.

A first treating fluid is injected through flexible conduit 27 into main conduit 26 extending from the surface of the earth to the downhole tool 22. The downhole tool 22 has perforations 28 through which the treating fluid may flow onto the surfaces of the subterranean formation 12 through openings 16 in casing 14. Upper packer 30 prevents flow of the treating fluid from the perforations upward within the casing. Lower packer 32 prevents flow of fluids from the perforation downward within the casing. Each of packers 30 and 32 is inflatable. Upper packer 30 and lower packer 32 are connected via pressure line 34 to a suitable source of pressure 36 at the surface. Instead of inflatable packers to afford the seal and prevent flow of treating fluids within the casing, mechanical packers which may be set with jars can be employed. It is vital, however, that the packers do not set so tightly that they cannot be moved within the casing. In any event, the upper and lower packers are set to form an isolated segment, which is still movable, within the well. The isolated segment communicates via perforations 28 with conduit 26, from the surface of the earth, through which the treating fluid is pumped. The treating fluid flows through conduit 26, through the isolated segment, through openings 16, and onto the adjacent formation.

While the treating fluid is being flowed through the isolated segment and onto the formation, apparatus 20 is moved upward within well 10 past the strata in formation 12. By controlling the flow of the treating fluid and the simultaneous movement vertically within the well of the isolated segment, the desired amount of treatment may be effected for each stratum. Ordinarily, apparatus 20 is moved upward at a substantially uniform rate and the injection is at a substantially uniform rate, effecting substantially uniform treatment of all strata within the formation.

Cable 42, attached to pack-off gland cap 41 and connected over sheave 43 mounted on supporting means 44 and to a suitable drawworks 45 having a power source 46, may be employed for raising and lowering apparatus 20 in the well. As shown in FIGURE 1, pack-off gland cap 41 is connected to pack-off gland 40 which is connected to apparatus 20 via valve 50.

Casinghead 37 is attached to the upper end of casing 14. Casinghead 37 contains apertures having sealing means around the periphery thereof. Suitable sealing means are illustrated simply as O-rings 37a. Casingheads containing the necessary apertures and sealing means are commercially available, e.g., the Hinderliter Casinghead. Such casingheads have fastening means illustrated schematically as gripping bushing 37b for suspending conduit therein. Thus, apparatus 20 may be held stationary by casinghead 37 when cable 42 is disconnected therefrom.

As will be seen, the invention provides a method of effecting the desired uniform treatment of a subterranean formation having strata of varying permeability without the expense and trouble of locating and setting straddle packers individually and successively at different strata having lower permeability than the remainder of the subterranean formation. The invention is particularly advantageous, however, when more than one treating fluid is to be employed in treating the subterranean formation.

Where more than one treating fluid is to be employed, the initial treatment is carried out in the manner described above. The subsequent steps in treating with the remaining treating fluids are described hereinafter.

Pig 38 is held in pack-off gland 40 for employment behind the first treating fluid. The pig 38 may be held in place by any suitable means, such as mechanical means 39 or magnetic means, as appropriate, or it may be allowed to rest on closed valve 50.

When a complete traverse has been made with the first treating fluid, the apparatus 20 may be lowered to the bottom of formation 12 to begin treatment with a second treating fluid. Ordinarily, the pressure on the packers is released by opening valve 48 before the apparatus is lowered to the bottom of the formation. Subsequently, valve 48 is closed and the packers reinflated before the second traverse of the formation is made with the second treating fluid.

Valve 50, which is a full-opening valve, is opened, allowing pig 38 to drop past line 52 containing valve 54 through which the second treating fluid will enter main conduit 26.

Simultaneously, the second treating fluid is injected through flexible conduit 27 and into main conduit 26. This injection drives pig 38 down main conduit 26 and past perforations 28.

Figure 2A:
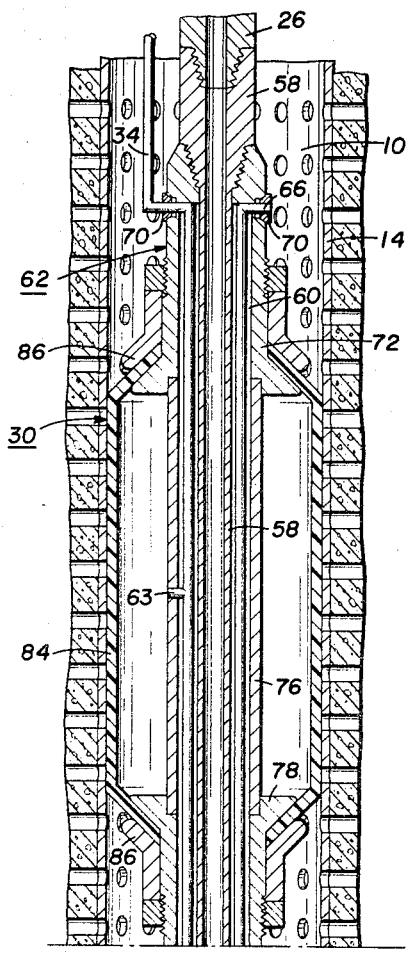
FIGURES 2a and 2b illustrate in cross section an embodiment of the downhole tool employed in the invention.
Figure 2B:
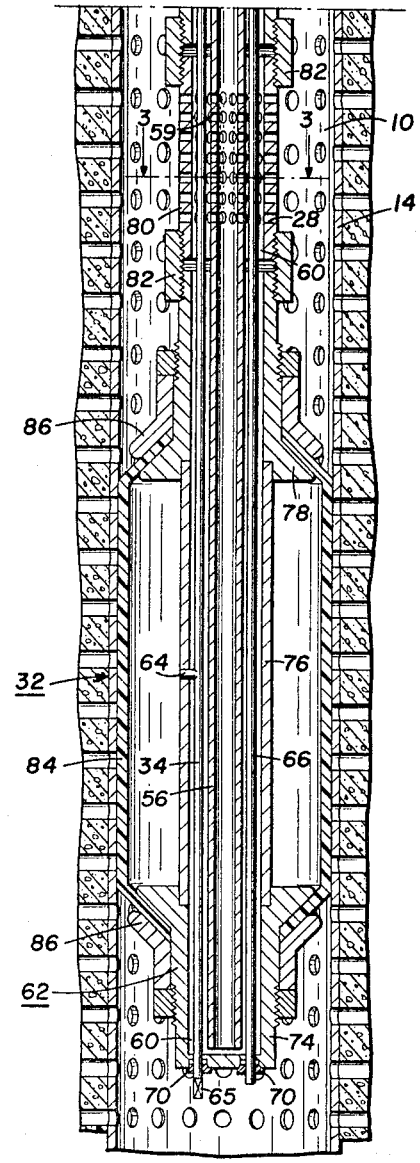

Once pig 38 reaches perforations 28 its velocity decreases and it falls into pig trap 56, shown in FIGURE 2b, at the bottom of inner liner 58, shown in FIGURE 2a, which is attached to main conduit 26. The pig will fall slowly into pig trap 56, the velocity depending upon the density of the pig and the amount of fluid leakage around the inner liner and back up the annulus 60 to perforations 28, or around the pig itself in pig trap 56. Ordinarily, it is desirable to have very little leakage around pig 38 in order to prevent mixing between the first treating fluid and the second treating fluid. Once the second treating fluid is being injected into the formation, as can be determined by the volume injected through flexible conduit 27, apparatus 20 is raised. While apparatus 20 is being raised, the second treating fluid flows out perforations 28 to effect the desired treatment of the strata within subterranean formation 12. As previously noted, this treatment is ordinarily uniform.

The treating fluids usually are flowed over the same strata of the subterranean formation. To achieve this, the downhole tool 22 and, hence, the isolated segment are moved through the same differential depth traverse when each treating fluid is being injected.

In FIGURES 2a and 2b, pressure line 34 is illustrated as it passes through the upper end of housing 62 and down through annulus 60. Pressure line 34 communicates via ports 63 and 64 with upper packer 30 and lower packer 32 to allow for inflation and deflation thereof. As illustrated, pressure line 34 extends down annulus 60 and exterior of the bottom end of housing 62 where it terminates in a check valve 65. Check valve 65 prevents overinflation of the packers. When the pressure in the packers exceeds a preset differential, check valve 65 vents fluid into the well. Depending upon packer design, the pressure differential may run from 2 to 50 pounds per square inch.

Ordinarily, as the downhole tool 22 is moved vertically within well 10, undesirable pressure buildup on the upstream side and pressure drawdown on the downstream side of tool 22 would occur. To alleviate the pressure inequality and the undesirable flow patterns induced thereby, vent tube 66 is provided. Vent tube 66 connects the region within well 10 above the upper packer 30 to the region below packer 32.

Both pressure line 34 and vent tube 66 penetrate the upper and lower ends respectively of housing 62 in fluid-tight connections. Such fluidtight connections 70 are well known and may comprise suitable bushings with or without O-rings.

Housing 62 is a multipiece housing and is comprised of (a) an upper end 72 and a lower end 74 which serve as buttressing flanges, (b) intermediate buttressing flanges 78, (c) rigid conduits 76 between, and (d) perforated treating section 80 joined to the intermediate buttressing flanges 78 by collars 82. Rigid conduits 76 sealingly fit into the buttressing flanges to allow inflation of the packers 30 and 32. The construction of packers 30 and 32 is well known and can be seen in FIGURES 2a and 2b. They are comprised of a flexible outer cover 84 held concentrically onto buttressing flanges by binding rings 86. Housing 62 is suitably fastened to inner liner 58, for example, by threads. Similarly, inner liner 58 is suitably fastened to main conduit 26, for example, by threads.

Figure 3:
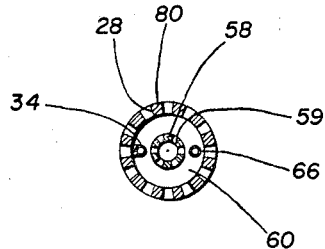
FIGURE 3 is a cross-sectional view of the tool at 3—3 in FIGURE 2b.

FIGURE 3 is a cross section of the downhold tool taken at 3—3 in FIGURE 2b. Inner liner 58, with its perforations 59, is shown in cross section as is perforated treating section 80 having perforations 28 therein. Vent line 66 in annulus 60 is also shown in cross section. Pressure line 34 is shown in cross section.

For simplicity, the specific embodiment has been described. For example, traversing from bottom to top has been described. It may be desirable to traverse the formation from top to bottom. Also, it may be desirable to treat with one fluid while traversing in one direction but traverse in the oposite direction when treating with another fluid. Further, treatment with a single fluid and treatment with both a first treating fluid and a second treating fluid have been described. More than two treating fluids may be employed, in which instances separate pigs may be employed between the respective treating fluids to ensure no mixing therebetween.

In rare instances it is possible to employ a downhole reservoir in conjunction with the downhole tool and eliminate the conduit to the surface of the earth. In this way, small treating operations can be carried out employing only a wire line rig.

Thus, although the invention has been described with particularity, it is understood that the present disclosure has been made only by way of example and that numerous changes in the details of construction and the combination and ararngement of parts may be resorted to without departing from the spirit and scope of the invention as hereinafter claimed.

What is claimed is:
1. A method of treating a subterranean formation penetrated by a well comprising:
 (a) forming an isolated but movable segment within said well,
 (b) flowing a first treating fluid through a conduit in said well from the surface of the earth to said isolated segment, through said isolated segment, and onto a portion of said formation adjacent thereto while simultaneously moving said isolated segment vertically within said well, (c) introducing a pig into said conduit, (d) flowing another treating fluid behind said pig, through said conduit, through said isolated segment, and onto a portion of said formation adjacent thereto while simultaneously moving said isolated segment vertically within said well, (e) trapping said pig in said conduit below said isolated segment, and (f) recovering said pig by pulling said conduit from said well.

2. The method of claim 1 wherein said desired treatment is a nearly uniform treatment, wherein said flowing is at a nearly uniform rate, and wherein said changing the position of said isolated segment vertically within said well is at a nearly uniform rate.

3. The method of claim 1 wherein pressure above and below said isolated segment is substantially equalized by allowing fluid to flow therebetween but preventing fluid communication within the well between said isolated segment and the space above and below said isolated segment.

4. The method of claim 1 wherein said isolated segment is moved vertically over the same differential depth traverse when said first treating fluid and said another treating fluid are being flowed onto said formation, whereby the same portion thereof is treated with each of said treating fluids.

References Cited

UNITED STATES PATENTS

| 1,298,083 | 3/1919 | Nevins | 166—186 |
| 2,055,515 | 9/1936 | Yarbrough | 166—101 |
| 2,177,601 | 10/1939 | Smith | 166—153 X |
| 2,399,125 | 4/1946 | Lehnhard | 166—147 |
| 2,481,422 | 9/1949 | Haynes et al. | 166—156 |

OTHER REFERENCES

Uren, Lester C.: Petroleum Production Engineering: Oil Field Exploitation, N.Y., McGraw-Hill, 3d Ed., 1953, pp. 11, 12, 408, 409, 416, 417.

JAMES A. LEPPINK, *Primary Examiner.*

I. A. CALVERT, *Assistant Examiner.*

U.S. Cl. X.R.

166—274, 156, 186